US012766898B2

(12) United States Patent
Vladimerou et al.

(10) Patent No.: US 12,766,898 B2
(45) Date of Patent: Oct. 20, 2026

(54) SYSTEMS AND METHODS FOR HANDS-FREE TOWING COUNTERMEASURES

(71) Applicant: TOYOTA MOTOR ENGINEERING & MANUFACTURING NORTH AMERICA, INC., Plano, TX (US)

(72) Inventors: Vladimeros Vladimerou, Whitmore Lake, MI (US); Yu Liu, Ann Arbor, MI (US); Noah Einstein, Canton, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 73 days.

(21) Appl. No.: 18/914,466

(22) Filed: Oct. 14, 2024

(65) Prior Publication Data

US 2026/0103036 A1 Apr. 16, 2026

(51) Int. Cl.
*B60D 1/62* (2006.01)
*B60D 1/30* (2006.01)

(52) U.S. Cl.
CPC *B60D 1/62* (2013.01); *B60D 1/30* (2013.01)

(58) Field of Classification Search
CPC ........ B62D 6/04; B62D 15/025; B62D 6/008; B62D 6/00; B62D 6/003; B62D 7/159; B62D 7/22; B62D 5/0457; B62D 5/0463; B62D 5/0472; B62D 6/002; B62D 1/28; B62D 1/286; B62D 15/029; B62D 5/046; B62D 6/007; B62D 6/10; B62D 7/1509; B62D 5/003; B62D 5/008; B62D 6/08; B62D 1/04; B62D 1/046; B62D 1/06; B62D 15/0265; B62D 37/00; B62D 49/007; B62D 5/001; B62D 5/005; B62D 5/0403; B62D 5/0409; B62D 5/0484; B62D 5/0487; B62D 53/005; B62D 53/0864; B62D 59/04; B62D 1/10; B62D 15/02; B62D 15/0225;
(Continued)

(56) References Cited

U.S. PATENT DOCUMENTS 5,854,987 A * 12/1998 Sekine .................. G01C 21/28 180/443
7,219,908 B1 * 5/2007 Howard .................. B62D 6/04 74/495
(Continued)

OTHER PUBLICATIONS

Ford Trailer Sway Control, https://www.sherwoodford.ca/blog/what-is-ford-trailer-swaycontrol/?srsltid=AfmBOopxJBiln1Z0VHvNTmCvfyzGpSGKrUw8T61fiWwBgJwZLMNaXbt (visited Aug. 13, 2024).
(Continued)

*Primary Examiner* — Daniel Previl
(74) *Attorney, Agent, or Firm* — HAYNES AND BOONE, LLP

(57) ABSTRACT

A system to provide trailer sway countermeasures during hands-free towing obtains sensor data of a vehicle related to a sway condition of a trailer. Based upon the sensor data, a driving scenario is predicted. The predicted driving scenario is then analyzed to determine whether, in the past, that driving scenario did not result in trailer sway. If the system determines the driving scenario has not resulted in sway, the system implements hands-free towing so long as the same driving scenario exists.

20 Claims, 8 Drawing Sheets

(58) Field of Classification Search

CPC ...... B62D 37/06; B62D 5/006; B62D 5/0448; B62D 5/0466; B62D 5/06; B62D 5/083; B62D 5/24; B62D 5/30; B62D 6/001; B62D 1/00; B62D 3/00; B62D 5/00; B62D 7/00; B62D 9/00; B62D 11/00; B60W 10/20; B60W 2540/18; B60W 2520/10; B60W 10/18; B60W 30/12; B60W 50/14; B60W 10/04; B60W 2540/12; B60W 2540/215; B60W 50/082; B60W 60/0053; B60W 2552/53; B60W 2710/202; B60W 30/045; B60W 40/02; B60W 10/111; B60W 10/184; B60W 2050/0073; B60W 30/09; B60W 30/16; B60W 40/08; B60W 50/0097; B60W 50/10; B60W 60/0055; B60W 2520/105; B60W 2530/203; B60W 2540/10; B60W 30/143; B60W 40/09; B60W 10/06; B60W 10/119; B60W 2050/0072; B60W 2520/14; B60W 2540/16; B60W 2540/165; B60W 2554/4045; B60W 2555/20; B60W 2710/18; B60W 2720/406; B60W 30/0956; B60W 30/14; B60W 30/182; B60W 40/10; B60W 40/114; B60W 50/085; B60W 60/0015; B60W 60/0059; B60W 10/10; B60W 2040/0818; B60W 2420/403; B60W 2552/20; B60W 2552/30; B60W 2554/00; B60W 30/02; B60W 30/10; B60W 50/04; B60W 60/0057; B60W 2050/0029; B60W 2050/0031; B60W 2050/007; B60W 2050/009; B60W 2050/0095; B60W 2050/143; B60W 2050/146; B60W 2300/14; B60W 2422/50; B60W 2510/0609; B60W 2510/1005; B60W 2510/202; B60W 2520/28; B60W 2530/00; B60W 2530/10; B60W 2540/00; B60W 2540/103; B60W 2540/223; B60W 2540/229; B60W 2552/00; B60W 2552/10; B60W 2552/40; B60W 2554/4041; B60W 2554/4042; B60W 2554/4049; B60W 2554/406; B60W 2554/80; B60W 2554/801; B60W 2556/10; B60W 2556/50; B60W 2710/20; B60W 2710/207; B60W 2720/40; B60W 30/00; B60W 30/165; B60W 30/18009; B60W 30/18054; B60W 30/18163; B60W 30/188; B60W 30/19; B60W 30/20; B60W 40/04; B60W 50/06; B60W 50/16; B60W 60/0011; B60W 60/0027; B60W 60/0051; B60W 60/007; B60W 2050/0094; B60W 2510/083; B60W 2510/18; B60W 2520/12; B60W 2520/125; B60W 2530/16; B60W 2552/15; B60W 2554/802; B60W 2554/804; B60W 2720/10; B60W 30/146; B60W 30/18145; B60W 40/068; B60W 50/087; B60W 60/0025; B60T 8/1755; B60T 2260/02; B60T 2260/08; B60T 2201/08; B60T 2201/087; B60T 7/22; B60T 13/662; B60T 17/18; B60T 2201/02; B60T 2201/024; B60T 2210/22; B60T 2210/36; B60T 2230/03; B60T 2250/04; B60T 2260/022; B60T 2270/313; B60T 7/107; B60T 8/175; B60T 8/17557; B60T 8/246; B60T 11/108; B60T 2270/86; B60T 8/172; B60T 8/17555; B60T 8/176; B60T 8/1761; B60T 8/1764; Y02T 8/1764; Y02T 10/7072; Y02T 90/40; Y02T 10/70; Y02T 10/72; Y02T 90/14; Y02T 90/16; B60K 1/00; B60K 15/07; B60K 17/3467; B60K 2001/005; B60K 35/10; B60K 35/28; B60K 35/29; B60K 23/08; B60K 2360/1446; B60K 2360/167; B60K 2360/175; B60K 2360/199; B60K 2360/782; B60K 28/02; B60K 35/22; B60K 35/60; B60K 2360/162; B60K 2360/171; B60K 35/212; B60K 35/231; B60K 35/25; B60K 35/81; F16H 61/702; F16H 61/0204; F16H 2059/0221; F16H 2061/0096; F16H 2061/0234; F16H 2063/426; F16H 59/08; F16H 61/16; F16H 63/42; F16H 2716/04; F16H 3/0915; F16H 61/0262; H01M 8/04059; H01M 8/04156; H01M 8/04179; Y02E 60/50; B60Q 9/00; G08G 1/0104; G08G 1/0112; G08G 1/0116; G08G 1/012; G08G 1/0129; G08G 1/0133; G08G 1/0145; G08G 1/015; G08G 1/056; G08G 1/08; G08G 1/081; G08G 1/082; G08G 1/083; G08G 1/087; G08G 1/095; G08G 1/096; G08G 1/167; G08G 1/048; G08G 1/096725; G08G 1/096741; G08G 1/096775; G08G 1/163; G08G 1/164; G08G 1/20; G08G 21/26; G08G 21/28; G06F 16/9538; G06F 16/9577; G06F 1/00; G06F 5/00; G06F 3/00; G06F 7/00; G06F 8/00; G06F 9/00; G06F 11/00; G06F 12/00; G06F 13/00; G06F 15/00; G06F 16/00; G06F 18/00; G06F 17/00; G06F 21/00; G06F 30/00; G06F 40/00; G06F 2101/00; G06F 2111/00; G06F 2113/00; G06F 2115/00; G06F 2117/00; G06F 2119/00; G06F 2123/00; G06F 2200/00; G06F 2201/00; G06F 2203/00; G06F 2205/00; G06F 2206/00; G06F 2207/00; G06F 2209/00; G06F 2211/00; G06F 2212/00; G06F 2213/00; G06F 2216/00; G06F 2219/00; G06F 2221/00; G06F 2218/00; G06Q 30/0201; G06Q 30/0251; G06Q 30/0282; G06Q 20/00; G06Q 10/00; G06Q 30/00; G06Q 40/00; G06Q 50/00; G06Q 90/00; G06Q 99/00; G06Q 2220/00; G06Q 2230/00; G06Q 2240/00; G06Q 2250/00; B60D 1/30; B60D 1/62; B60D 1/00; B60D 3/00; B60D 5/00; B60D 99/00

USPC .... 340/431, 426.22, 426.11, 426.16, 426.33, 340/432–439, 444, 457.3, 464–465, 467

See application file for complete search history.

(56) References Cited

U.S. PATENT DOCUMENTS

| | | | | |
|---|---|---|---|---|
| 8,165,770 | B2 * | 4/2012 | Getman | B60T 8/1755 280/445 |
| 8,571,777 | B2 | 10/2013 | Greene | |
| 10,173,722 | B2 | 1/2019 | Khaligh et al. | |
| 10,328,917 | B2 | 6/2019 | Ying et al. | |
| 11,827,231 | B2 | 11/2023 | Lin et al. | |

(56) References Cited

U.S. PATENT DOCUMENTS

| | | | | |
|---|---|---|---|---|
| 11,845,444 | B2 | 12/2023 | McGrory et al. | |
| 2004/0148078 | A1* | 7/2004 | Nakano | B62D 5/008 180/443 |
| 2005/0137769 | A1* | 6/2005 | Takamatsu | B60T 7/22 701/1 |
| 2008/0147276 | A1* | 6/2008 | Pattok | B62D 6/04 701/42 |
| 2019/0233034 | A1* | 8/2019 | Viele | B60D 1/36 |
| 2021/0008958 | A1* | 1/2021 | Porta | H04W 68/02 |
| 2023/0260288 | A1 | 8/2023 | Young et al. | |
| 2024/0067220 | A1* | 2/2024 | Shahriari | B60W 30/045 |
| 2024/0227782 | A9 | 7/2024 | Weston et al. | |

OTHER PUBLICATIONS

Zhang et al., "Reconfigurable Model Predictive Control for Articulated Vehicle Stability with Experimental Validation," Zhang et al., IEEE Transactions on Transportation Electrification, vol. 6, No. 1, pp. 308-317, Mar. 2020.

* cited by examiner

| # | Parameter | Consequence of Parameter *Increase* | Effect on Stability |
|---|---|---|---|
| 1 | Road μ | Improve Tire Forces | More Stable |
| 2 | Tongue Weight | ↑ | More Stable |
| 3 | Tire Stiffness | ↑ | More Stable |
| 4 | Tire Pressure | ↑ | More Stable |
| 5 | Trailer Weight | Increase Inertia | Less Stable |
| 6 | Hitch Length | ↑ | Less Stable |
| 7 | Speed | ↑ | Less Stable |
| 8 | Lateral Acceleration | Increase Inertia<br>Trigger Sway | Less Stable |
| 9 | Lateral forces | ↑ | Less Stable |
| 10 | $V_{trailer} - V_{vehicle}$ | Trigger Sway | Less Stable |
| 11 | Longitudinal Decel. | ↑ | Less Stable |

FIG. 2C

SYSTEMS AND METHODS FOR HANDS-FREE TOWING COUNTERMEASURES

TECHNICAL FIELD

The subject matter described herein relates generally to hands-free driving and, more particularly, to systems and methods for hands-free towing.

BACKGROUND

Sway is a condition whereby a vehicle trailer or the rear of the towing vehicle swings back and forth. There are a variety of factors that enable trailer sway while towing: a disproportionally heavy trailer, an improperly balanced trailer, high towing speeds, improper tire pressure on the towing vehicle, wind disturbance/crosswinds and turbulence from tall profile vehicles, for example.

To date, conventional approaches have failed to provide sufficient hands-free towing capabilities because those systems simply restrict hands-free towing in certain situations where hands-free driving without a trailer would be allowed.

SUMMARY

Accordingly, to overcome the limitations of the conventional art, the present disclosure provides a hands-free towing system which conservatively increases the domain of hands-free towing, so as to reduce the risk of sway happening during hands off towing. The system's aim is, if sway happens, to limit the sway to conditions where the driver's hands are on the steering wheel.

A generalized embodiment of the present disclosure provides a computer-implemented method to provide trailer sway countermeasures during hands-free towing. Processing circuitry communicably coupled to one or more sensors of a vehicle obtains sensor data of the vehicle related to a sway condition of a trailer. Based upon the sensor data, the system predicts a driving scenario of the vehicle. If the system determines the driving scenario has been fault-free of sway conditions, the system will implement hands-free towing so long as the driving scenario exists.

In another generalized embodiment, a vehicle is provided which comprises a trailer and one or more sensors communicably coupled to the trailer. Processing circuitry communicably coupled to the sensors then obtain sensor data of the vehicle related to a sway condition of the trailer. The processor predicts, based upon the sensor data, a driving scenario of the vehicle. Once it is determined the driving scenario has been fault-free, the system then implements hands-free towing so long as the driving scenario exists.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which:

FIG. 2C is a chart of parameters which can exacerbate sway, according to certain illustrative embodiments of the present disclosure.

DETAILED DESCRIPTION

Figure 1:
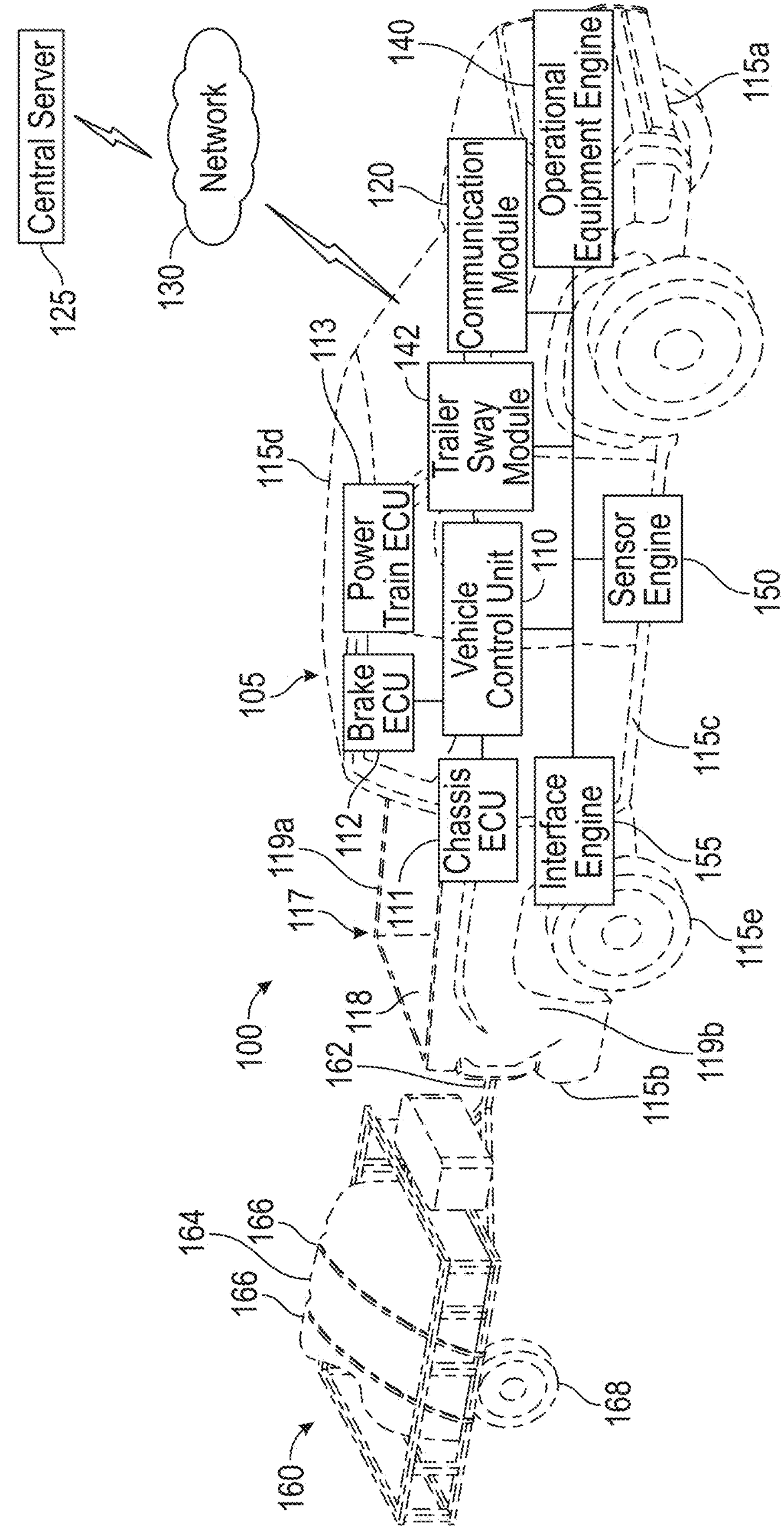
FIG. 1 is a diagrammatic illustration of a hands-free towing system in accordance with at least one embodiment of the present disclosure.

The present disclosure is generally directed to systems and methods to provide hands-free vehicle towing. Illustrative embodiments of the present disclosure provide systems to avoid hands-free control of a towing vehicle when trailer sway is likely to occur. When towing, a trailer may sway, oscillate, or fishtail relative to the trailering vehicle. If uncontrolled, trailer sway poses a danger to the vehicle, the trailer, occupants in the vehicle, and other road users. Trailer sway may be particularly problematic during hands-free vehicle operation when the driver has reduced control over the vehicle due to not grasping the steering wheel.

In general, systems of the present disclosure verify whether trailer sway in certain scenarios is likely/not likely to occur. In some embodiments, this verification occurs while a driver has their hands on the steering wheel. In other embodiments, the verification may occur while in a hands-free mode. Subsequently, the same vehicle-trailer configuration may be operated in a hands-free configuration under similar driving conditions. Accordingly, the system allows hands-free towing Specifically, during scenarios where trailer sway is predicted (e.g., lane change, entering steeply curved roadways, approaching high-profile vehicles in an adjacent lane, exiting a tunnel), while the vehicle is under manual control or in a hands-free mode, the system monitors specific key performance indicators (KPIs) (e.g., new or previously-towed trailer, change in rear tire pressure, change in speed, predicted disturbance from passing high profile traffic, curve entry/exit, etc.). If no sway is detected for given conditions and the KPIs are within target ranges, at a later point in time, the system allows hands-free towing (e.g., automated lane centering of the vehicle/trailer combination while towing) with the established driving scenario/conditions.

A generalized embodiment of the present disclosure provides a computer-implemented method to provide trailer sway countermeasures during hands-free towing. Sensor data of a vehicle related to a sway condition of a trailer is obtained using processing circuitry communicably coupled to one or more sensors of the vehicle. The processor then predicts, based upon the sensor data, a driving scenario of the vehicle. The predicted driving scenario is then analyzed to determine whether, in the past, that driving scenario has been fault-free (i.e., it did not result in trailer sway). If the processor determines the driving scenario has been fault-free, the processor implements hands-free towing so long as the same driving scenario exists.

Another generalized embodiment of the present disclosure provides a computer-implemented method to provide trailer sway countermeasures during hands-free towing. The processor analyzes sensor data obtained during a towing condition and determines whether a sway condition exists. Thereafter, the processor will enable hands-free towing so long as the sway condition does not exist.

The hands-free towing system described herein may be implemented as a process at least partially implemented on a display, and operated by a control process executing on a processor that accepts user inputs from vehicle components, a suitable user-interface and other control devices, that are in communication with one or more hands-free towing system mechanisms. In that regard, the control process performs certain specific operations in response to different inputs or selections made at different times, and/or in response to real-time or near-real-time user or vehicle inputs.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. It is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

These descriptions are provided for exemplary purposes, and should not be considered to limit the scope of the hands-free towing system embodiments described herein. Certain features may be added, removed, or modified without departing from the spirit of the claimed subject matter.

FIG. 1 is a diagrammatic illustration of a hands-free towing system in accordance with at least one embodiment of the present disclosure. In an example, a hands-free towing system is referred to by the reference numeral 100 and includes a vehicle 105, such as a pickup truck, and a vehicle control unit 110 located on the vehicle 105. The vehicle 105 may include a front portion 115*a* (including a front bumper), a rear portion 115*b* (including a rear bumper), a right side portion 115*c* (including a right front quarter panel, a right front door, a right rear door, and a right rear quarter panel), a left side portion 115*d* (including a left front quarter panel, a left front door, a left rear door, and a left rear quarter panel), and wheels 115*e*. The rear portion 115*b* includes a truck bed 117 having a tailgate member 118, a first side wall 119*a* and a second side wall 119*b*.

Vehicle 105 includes a trailer 160 connected via a hitch 162. Cargo 164 is secured atop trailer 160 using straps 166. Although not shown, trailer 160 may include one or more sensors to detect various parameters related to trailer 160 including, for example, the weight distribution across trailer 160, tire pressure of tires 168 and lateral movement of trailer 160. In one example, the system detects lateral movement/sway of the vehicle by comparing the detected yaw rate (detected using onboard sensors) with an "expected" yaw rate based upon the vehicle-trailer dynamics. If the yaw rate deviates sufficiently enough from the expected value, it means something is going on that agitates the lateral dynamics around the vertical axis, which would be the sway of the trailer. Vehicle control unit 110, trailer sway module 142 and sensor engine 150 can communicate with sensors onboard trailer 160 via wired or wireless means. Wired means may include, for example, communication links across hitch 162.

A communication module 120 is operably coupled to, and adapted to be in communication with, the vehicle control unit 110. The communication module 120 is adapted to communicate wirelessly with a central server 125 via a network 130 (e.g., a 3G network, a 4G network, a 5G network, a Wi-Fi network, or the like). The central server 125 may provide information and services including but not limited to include location, mapping, route or path, and topography information.

An operational equipment engine 140 is operably coupled to, and adapted to be in communication with, the vehicle control unit 110 and trailer sway module 142 which is utilized to perform the methods described herein. A sensor engine 150 is operably coupled to, and adapted to be in communication with, the vehicle control unit 110. The sensor engine 150 is adapted to monitor various components of, for example, the operational equipment engine 140 and various other components.

An interface engine 155 is operably coupled to, and adapted to be in communication with, the vehicle control unit 110. In addition to, or instead of, being operably coupled to, and adapted to be in communication with, the vehicle control unit 110, the communication module 120, the operational equipment engine 140, trailer sway module 142, the sensor engine 150, and/or the interface engine 155 may be operably coupled to, and adapted to be in communication with, another of the components via wired or wireless communication (e.g., via an in-vehicle network). In some examples, the vehicle control unit 110 is adapted to communicate with the communication module 120, the operational equipment engine 140, trailer sway module 142, the sensor engine 150, and the interface engine 155 to at least partially control the interaction of data with and between the various components of hands-free towing system 100.

The term "engine" is meant herein to refer to an agent, instrument, or combination of either, or both, agents and instruments that may be associated to serve a purpose or accomplish a task—agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 110, the communication module 120, the network 130, or a central server 125.

In this example, the vehicle 105 also includes a chassis electronic control unit (ECU) 111 which controls elements of the vehicle's suspension system, a brake ECU 112 which controls the braking system or elements thereof, a power train ECU 113 (variously known as an engine ECU, power plant ECU, motor ECU, or transmission ECU) that controls elements of the motor 195 and drivetrain 200, and sensor engine 150.

A reader of ordinary skill in the art will understand that other components or arrangements of components may be found in a vehicle 105, and that the same general principles apply to electric vehicles, internal combustion vehicles, and hybrid vehicles. For example, a power train ECU 113 may control both motor and transmission components. Alternatively, a separate motor ECU and transmission ECU may exist, or some functions of a motor ECU or transmission ECU may be performed by the VCU 110.

Figure 2A:
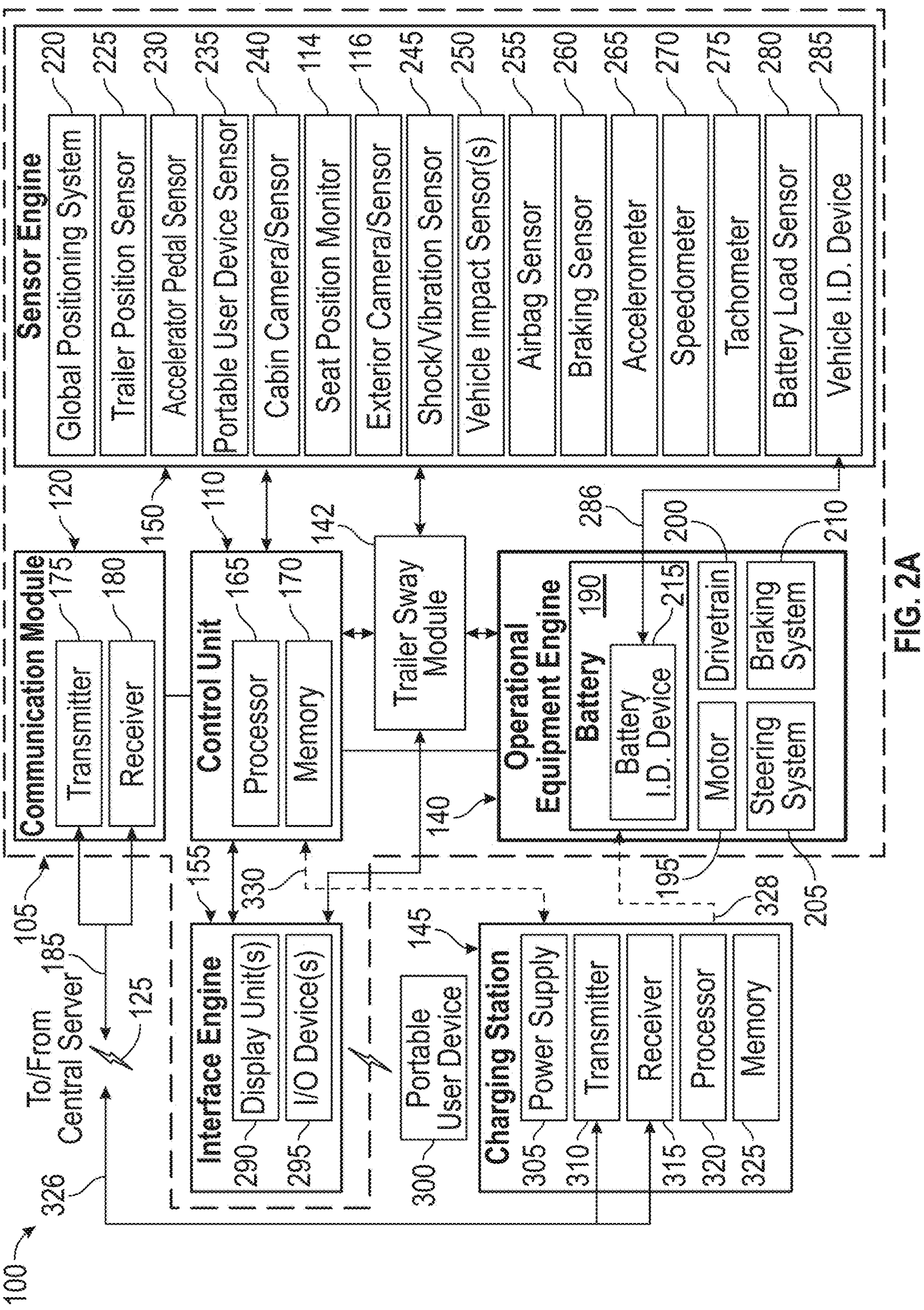
FIG. 2A is a diagrammatic illustration, in a block-diagram form, of at least a portion of the hands-free towing system 100 of FIG. 1, in accordance with at least one embodiment of the present disclosure.

FIG. 2A is a diagrammatic illustration, in a block-diagram form, of at least a portion of the hands-free towing system 100 of FIG. 1, in accordance with at least one embodiment of the present disclosure. It is worth noting that the components of the vehicle 105 may be located either permanently or temporarily as a part of the vehicle 105. The vehicle control unit (VCU) 110 includes a processor 165 and a memory 170. In some examples, the communication module 120, which is operably coupled to, and adapted to be in communication with, the vehicle control unit 110, includes a transmitter 175 and a receiver 180. In some examples, one or the other of the transmitter 175 and the receiver 180 may be omitted according to the particular application for which the communication module 120 is to be used. In other examples, the transmitter 175 and receiver 180 are combined into a single transceiver that performs both transmitting and receiving functions.

In some examples, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a vehicle battery 190, a motor 195, a drivetrain 200, a steering system 205, and a braking system 210. In some vehicles, the vehicle battery 190 may provide electrical power to the motor 195 to drive the wheels 115*e* of the vehicle 105 via the drivetrain 200. In some examples, instead of or in addition to providing power to the motor 195 to drive the wheels 115*e* of the vehicle 105 via the drivetrain or transmission 200, the vehicle battery 190 provides electrical power to another component of the operational equipment engine 140, the vehicle control unit 110, the communication module 120, the sensor engine 150, the interface engine 155, or any combination thereof. In some examples, the vehicle battery 190 includes a battery identification device 215.

The battery identification device 215 is adapted to communicate with one or more components of the sensor engine 150, and stores data identifying the vehicle battery 190 such as, for example, manufacturing information (e.g., production date, production facility, etc.), battery characteristic(s) information, battery identification number information, electric vehicle compatibility information, or the like. In some embodiments, the motor is an internal combustion motor and the battery operates a starter.

In some examples, the sensor engine 150, which is operably coupled to, and adapted to be in communication with, the vehicle control unit 110, includes devices such as sensors, cameras, meters, detectors, or other devices configured to measure or sense a parameter related to a driving (or hands-free driving) operation of the vehicle 105. For example, the sensor engine 150 may include a global positioning system 220 that can be used to determine road grade, a trailer position sensor 225 to determine the position or sway of trailer 160 (e.g., accelerometer-based designs to detect sway) in the lane or relative to vehicle 105, an accelerator/brake pedal sensor 230, a portable user device sensor 235 that can be used to determine when a certain driver or user is in the vicinity or inside vehicle 105, a cabin camera/sensor 240 used to monitor the position of persons within vehicle 105, a seat position monitor 114 used to control and monitor the position of the vehicle seats, a shock/vibration sensor 245, a vehicle impact sensor 250, an airbag sensor 255, a braking sensor 260, an accelerometer 265 (which may in some cases also serve as an inclinometer), a speedometer 270, a tachometer 275, a battery load sensor 280, a vehicle identification device 285, one or more exterior cameras or sensors 116 that can be used to monitor traffic, road conditions, and/or weather conditions around the vehicle, or any combinations thereof. In some instances, traffic or weather patterns may be monitored from outside the vehicle and received from a server via a network. Further, the sensor data may also include tire pressure sensors to measure pressure in tires 168 or tires 115*e* of vehicle 105.

Further, the sensors or other detection devices 116 may be configured to sense or detect activity, conditions, and circumstances in an area to which the device has access, e.g., ambient conditions, conditions within the vehicle cabin, etc. Sub-components of the sensor engine 150 may be deployed at any operational area where information on the driving of the vehicle 105 may occur. Some readings from the sensor engine 150 may be fed back to the vehicle control unit 110. Stored and reported performance data may include the sensed data, or may be derived, calculated, or inferred from sensed data. The vehicle control unit 110 may send signals to the sensor engine 150 to adjust the calibration or operating parameters of the sensor engine 150 in accordance with a control program in the vehicle control unit 110. The vehicle control unit 110 is adapted to receive and process performance data from the sensor engine 150 or from other suitable source(s), and to monitor, store (e.g., in the memory 170), and/or otherwise process (e.g., using the processor 165) the received performance data.

The braking sensor 260 is adapted to monitor usage of the vehicle 105's braking system 210 (e.g., an antilock braking system 210) and to communicate the braking information to the vehicle control unit 110. The accelerometer 265 is adapted to monitor acceleration of the vehicle 105 and to communicate the acceleration information to the vehicle control unit 110. The accelerometer 265 may be, for example, a two-axis accelerometer 265 or a three-axis accelerometer 265, and may also serve as an inclinometer or tilt sensor. In some examples, the accelerometer 265 is associated with an airbag of the vehicle 105 to trigger deployment of the airbag. The speedometer 270 is adapted to monitor speed of the vehicle 105 and trailer 160 and to communicate the speed information to the vehicle control unit 110.

In some examples, the speedometer 270 is associated with a display unit of the vehicle 105 and trailer 160 such as, for example, a display unit of the interface engine 155, to provide a visual indication of vehicle speed to a driver of the vehicle 105. The tachometer 275 is adapted to monitor the working speed (e.g., in revolutions-per-minute) of the vehicle 105's motor 195 and to communicate the angular velocity information to the vehicle control unit 110. In some examples, the tachometer 275 is associated with a display unit of the vehicle 105 such as, for example, a display unit of the interface engine 155, to provide a visual indication of the motor 195's working speed to the driver of the vehicle 105. The battery load sensor 280 is adapted to monitor charging, discharging, and/or overcharging of the vehicle battery 190 and to communicate the charging, discharging, and/or overcharging information to the vehicle control unit 110.

In some examples, the vehicle identification device 285 stores data identifying the vehicle 105 and/or trailer 160 such as, for example, trailer specifications, manufacturing information (e.g., make, model, production date, production facility, etc.), vehicle characteristic(s) information, vehicle identification number ("VIN") information, battery compatibility information, or the like. The vehicle identification device 285 is adapted to communicate with the battery identification device 215 (or vice versa), as indicated by arrow 286. In some examples, the vehicle identification device 285 and the battery identification device 215 may each communicate with the vehicle control unit 110.

In some examples, the interface engine 155, which is operably coupled to, and adapted to be in communication with, the vehicle control unit 110, includes at least one input and output device or system that enables a user to interact with the vehicle control unit 110, trailer sway module 142, and the functions that the vehicle control unit 110 provides. The interface engine 155 may include a display unit 290 and an input/output ("I/O") device 295 through which the user can interact with the system.

The display unit 290 may be, include, or be part of multiple display units. In some examples, the display unit 290 may include one, or any combination, of a central display unit associated with a dash of the vehicle 105, an instrument cluster display unit associated with an instrument cluster of the vehicle 105, and/or a heads-up display unit associated with the dash and a windshield of the vehicle 105; accordingly, as used herein the reference numeral 290 may refer to one, or any combination, of the display units. The I/O device 295 may be, include, or be part of a communication port (e.g., a USB port), a Bluetooth communication interface, a touch-screen display unit, soft keys associated with a dash, a steering wheel, or another component of the vehicle 105, and/or similar components. Other examples of sub-components that may be part of the interface engine 155 include, but are not limited to, audible alarms, visual alerts, telecommunications equipment, and computer-related components, peripherals, and systems.

As previously mentioned, in some examples, a portable user device 300 belonging to an occupant of the vehicle 105 may be coupled to, and adapted to be in communication with, the interface engine 155. For example, the portable user device 300 may be coupled to, and adapted to be in communication with, the interface engine 155 via the I/O device 295 (e.g., the USB port and/or the Bluetooth communication interface). In an example, the portable user device 300 is a handheld or otherwise portable device which is carried by a user who is a driver or a passenger on the vehicle 105. In addition, or instead, the portable user device 300 may be removably connectable to the vehicle 105, such as by temporarily attaching the portable user device 300 to the dash, a center console, a seatback, or another surface in the vehicle 105. In another example, the portable user device 300 may be permanently installed in the vehicle 105. In some examples, the portable user device 300 is, includes, or is part of one or more computing devices such as personal computers, personal digital assistants, key fobs, cellular devices, mobile telephones, wireless devices, handheld devices, laptops, audio devices, tablet computers, game consoles, cameras, and/or any other suitable devices. In several examples, the portable user device 300 is a smartphone such as, for example, an iPhone® by Apple Incorporated.

With further reference to FIG. 2A, the hands-free towing system 100 also includes a trailer sway module 142, the operation of which will be described below. In some embodiments, the tailgate activation module 142 is communicably coupled to various components, and may also include its own processor and memory. As described herein, the trailer sway module 142 enables the trailer sway analysis and countermeasure implementation discuss herein. To achieve this, the trailer sway module 142 is in communication with one or more of the sensor engine 150, VCU 110, operational equipment engine 140, or interface engine 155.

A reader of ordinary skill in the art will understand that other components or arrangements of components may be found in a vehicle 105, and that may of the same general principles apply to electric vehicles, internal combustion vehicles, and hybrid vehicles.

As mentioned herein, illustrative embodiments of the present disclosure provides systems and methods to reduce unpredictable sway scenarios during hands-free (automated) driving. As described in more detail below, certain embodiments of the present disclosure verify that towing in certain scenarios is deemed likely not to suffer from sway using pre-verified driver scenarios which did not result in sway. The pre-verified driver scenarios may include hands-on or hands-free towing scenarios which did not result in sway conditions. The driving scenario(s) includes, for example, a vehicle-trailer configuration, map of driving scene ahead, vehicle speed, surrounding traffic, road design or whether conditions, which may be determined using data and sensors onboard vehicle 105 or trailer 160. During operation, hands-free towing system 100 allows hands-free towing so long as the pre-verified driving scenario exists. Once hands-free towing system 100 determines the pre-verified driving scenario(s) no longer exists, the system implements sway countermeasures while still in hands-free mode. The sway countermeasures may include, for example, adjusting vehicle speed, manipulating steering, requesting hands-on towing (or other related alert) or deactivating hands-free towing.

Figure 2B:
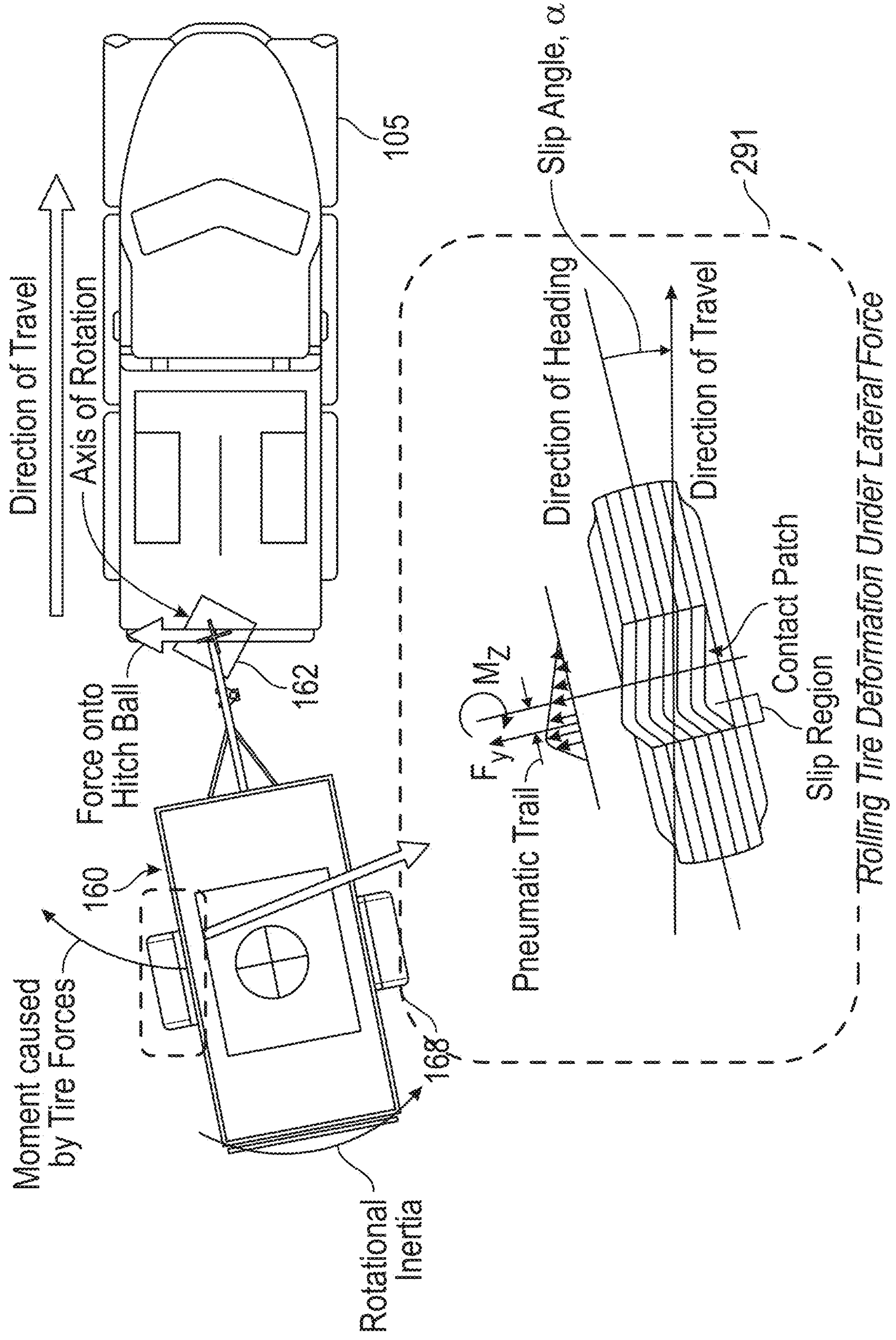
FIG. 2B is a top view of a towing vehicle and trailer to illustrate the mechanism of sway, according to certain illustrative embodiments of the present disclosure.

FIG. 2B is a top view of a towing vehicle and trailer to illustrate the mechanism of sway, according to certain illustrative embodiments of the present disclosure. Vehicle 105 is shown along with trailer 160 going in a direction of travel. Sway may be triggered in a variety of ways including, for example, a road surface bump or other lateral force pushing on the side of trailer 160. Such triggers can trigger rotational inertia due to the mass of trailer 160. In turn, a corrective force is then applied by tires 168, as the tire deformation pushes trailer 160 back to the center of the axis of rotation/vehicle 105 (moment caused by tire forces). In general, the larger the amplitude of the deviation of tire 168, the larger the tire deformation, the larger the return force—which works to stabilize trailer 160, as shown in block 291. However, the lateral force from the tire 168 may not be enough to overcome inertia and resonance could occur (amplitude increases with each oscillation), which leads to more violent sway. As the trailer 160 sways, those lateral forces move to hitch 162 and grow, eventually beginning to push/rotate vehicle 105 itself.

There are a variety of other trailer sway models useful to illustrate sway stability control, as will be understood by those ordinarily skilled in the art having the benefit of this disclosure. One such model is the one described in W. Cho, Y. Yoon and S.-H. You, "A Study on Sway Stability Control Methods for Tractor-Trailer System Using Rear Wheel Steering," in IEEE Access, vol. 12, pp. 66952-66963, 2024, doi: 10.1109/ACCESS.2024.3398715, which is hereby incorporated by reference in its entirety.

FIG. 2C is a chart of parameters which can exacerbate sway, according to certain illustrative embodiments of the present disclosure. The parameters include: road friction coefficient μ, tongue weight, tire stiffness, tire pressure, trailer weight, hitch length, speed, lateral acceleration, lateral forces, $v_{trailer}-v_{vehicle}$ and longitudinal deceleration. As road friction increases, tire forces are improved which results in more stability of the trailer against sway. One example in which road friction can be monitored is based upon the speed of the windshield wipers.

In general, an increase in the tongue weight, tire stiffness and tire pressure also result in more stability against sway. Too much tongue weight, however, can causes problems by reducing traction on steering tires of the towing vehicle. Similarly, too much tire stiffness can also be detrimental. Tongue weight may be monitored, for example, using a weight sensor on hitch 162 which is reset each time the vehicle 105 is parked or parked for a certain amount of time. Also, it is possible to over inflate the tires which could lead to increased instability. Further, over-stiffness of the tires may also be detrimental to stability, such as in the case of low-profile tires. Thus, for example, system 100 may disable hands-free towing when the pressure is too low or too high.

Still referencing FIG. 2C, as trailer weight increases the inertia also increases, which exacerbates sway. Thus, in certain examples, system 100 can reset stable weight ranges each time vehicle 105 is parked or parked for a defined time period.

Instability also increases as the length of the hitch 162 and vehicle speed increases. In some examples, the system 100 monitors speed hands-on while the speed is above a minimum threshold and will progressively allow hands-free towing as those speeds are confirmed as sway-stable.

The lateral acceleration refers to the phenomena whereby, when in a curve, forces push the trailer/towing vehicle out while in the curve. This increased inertia also results in less stability. As lateral forces (wind) increases, stability decreases. Lateral accelerations can be predicted based upon the road map (or road scene cameras). The system 100 may allow hands-free towing if those lateral force values were previously confirmed. Otherwise, hands-on countermeasure is implemented until those force values are confirmed sway-safe. In other examples, the system 100 may request hands-on towing when a high-profile vehicle is predicted to pass.

The parameter $v_{trailer}-v_{vehicle}$ refers to velocity slow down whereby the towing vehicle slows down, but the trailer does not slow or slows at a slower pace than the towing vehicle—also resulting in increased instability. Here, system 100 may request a hands-on countermeasure based upon the road grade. Longitudinal deceleration (e.g., braking, vehicle cut-in in front of towing vehicle, etc) can also increase instability. Also, here system 100 may request a hands-on countermeasure during certain decelerations (e.g., above a defined deceleration value threshold). Note, however, FIG. 2C is one example, as the direction of change of some of the parameters of FIG. 2C does not always increase or decrease stability, which would be understood by those ordinarily skilled in the art having the benefit of this disclosure.

Accordingly, illustrative embodiments of the present disclosure prevent the enabling of hands-free control when unpredictable/high risk sway situations. However, through the use of countermeasures (e.g. requiring hands-on towing), the system's hands-free operational domain can be expanded. Further, when sway does occur, the system ensures the controller/processor does not amplify the sway and keeps the vehicle in lane while trailer stability control (TSC) is activated. TSC works by torquing the vehicle against the rotation caused by sway.

Figure 3A:
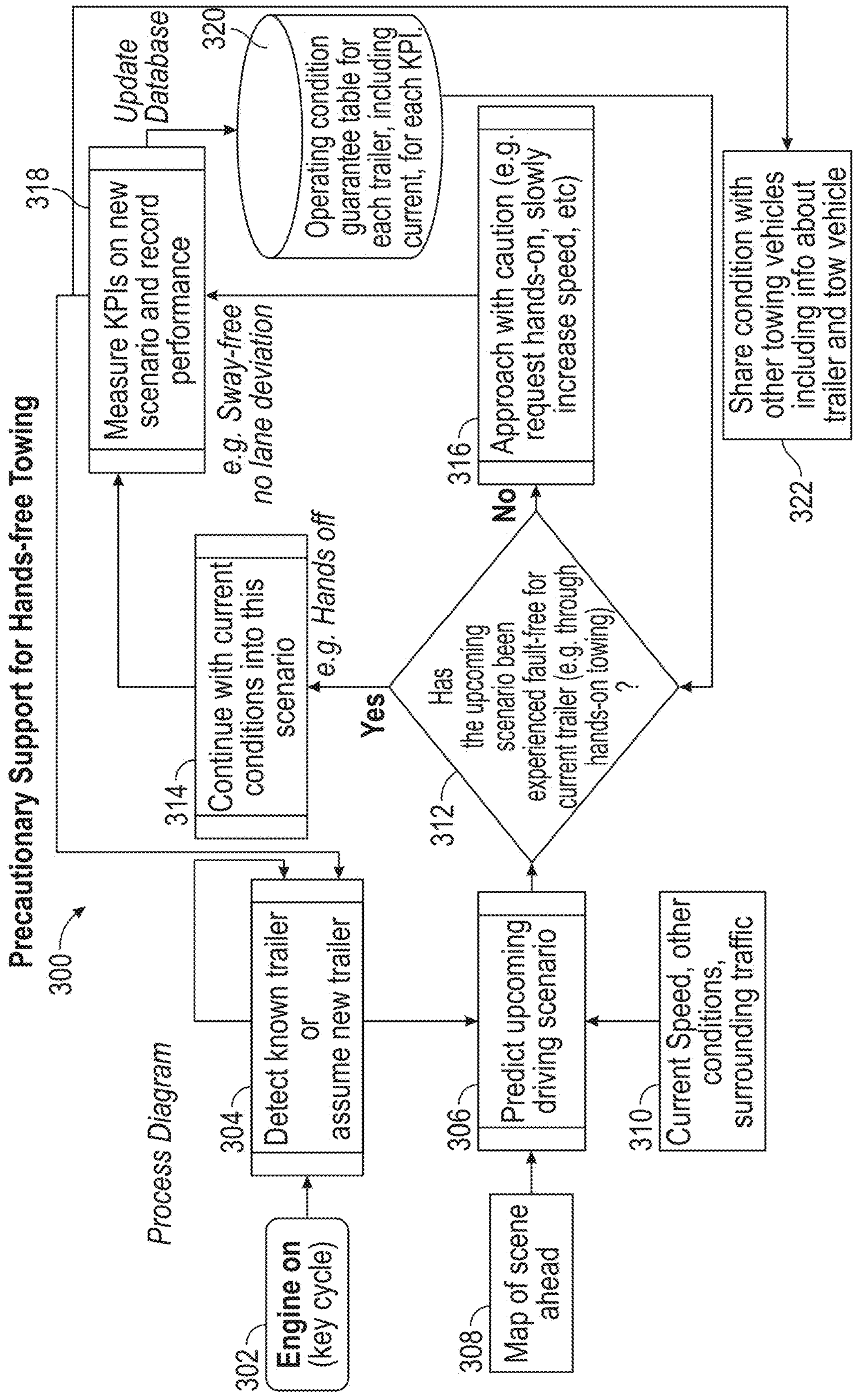
FIG. 3A is a process diagram 300 of an illustrative embodiment of the present disclosure.

FIG. 3A is a process diagram 300 of an illustrative embodiment of the present disclosure. At block 302, the engine of vehicle 105 is activated. Once activated, hands-free towing system 100 obtains the specifications of trailer 160 automatically or manually, at block 304. In the automated example, hands-free towing system 100 detects the specifications of trailer 160 using, for example, sensors onboard trailer 160 or specification data provided by some processor onboard trailer 160 or otherwise. In the manual example, hands-free towing system 100 may receive trailer specification data manually via a suitable user interface such as, for example, a touchscreen display. The trailer specification data may include, for example, the make/model of trailer 160, weight, dimensions, speed tolerance, hitch length (distance from hitch to center of mass), and trailer beam length (distance from hitch to trailer axle or average location of trailer axles). Note hitch length is generally considered a vehicle parameter.

Hands-free towing system 100 may conduct block 304 each time the engine starts. Alternatively, block 304 may be performed each time vehicle 105 is parked. At block 306, hands-free towing system 100, via trailer sway module 142, predicts the upcoming driving scenario while vehicle 105 is being driven. Such prediction may be simulated, for example, using any suitable simulation technique, as will be understood by those ordinarily skilled in the art having the benefit of this disclosure. In doing so, trailer sway module 142 obtains a variety of sensor data including a map of the scenery ahead (using e.g., global positioning system 220, exterior camera/sensors 116) at block 308. The scenery ahead may include upcoming traffic, the dimensions of such upcoming traffic and any predicted disturbance to vehicle 105 as the upcoming vehicle passes. In addition, sensor data related to, for example, the current speed, surrounding traffic and other conditions (e.g., environmental/weather conditions) is obtained at block 310. Sensor data may further include vehicle and trailer specifications or road design information, including any of the parameters discussed in FIG. 2C.

Using this data, trailer sway module 142 predicts the upcoming driving scenario at block 306. Thereafter, at block 312, trailer sway module 142 determines whether the upcoming driving scenario experienced fault-free towing (i.e., no sway-fault condition existed) in the past with the current trailer being towed. In order to make this determination, trailer sway module 142 must compare past no-fault driving scenarios with the predicted driving scenario. Accordingly, the past no-fault driving scenarios have already been recorded by hands-free towing system 100. Here, trailer sway module 100 records trailer-vehicle specifications and related driving conditions (also referred to as Key Performance Indicators) during previous hands-on or hands-free towing. Those prior driving scenarios which did not result in sway conditions are recorded as being fault-free scenarios, while those driving scenarios which did result in sway conditions are recorded as fault (or sway) scenarios. These pre-recorded scenarios are then stored and used by trailer sway module 142 to determine fault-free predicted driving scenarios.

Therefore, at block 312, if trailer sway module 142 determines the upcoming/predicted driving scenario was experienced fault-free in the past, the system allows hands-free towing to continue (or enables it) at block 314, so long as the fault-free driving scenario exists. Here, for example, trailer sway module 142 allows hands-free automated lane centering while towing at established driving conditions (in future hands-free driving situations with the same trailer). Such established driving conditions may include, for example, same trailer and same loading (i.e., within same ignition cycle/trip), same (or previously established-as-stable/fault-free) speed, same (or previously established-as-stable/fault-free) tire pressure, same torque expected due to upcoming curve entry, same parameters discussed in FIG. 2C, etc.

If, however, at block 312, trailer sway module 142 determines the upcoming/predicted driving scenario was not experienced fault-free in the past, the system will implement trailer sway countermeasures at block 316. These fault scenarios are those which introduce sway preconditions and may include, for example, lane changes, entering relatively steep curves, approaching high profile vehicles on the adjacent lane, exiting tunnel, etc., or another trailer status change (e.g., weight shift/tongue weight change)—such conditions as would be affected by those parameters of FIG. 2C. The countermeasures may take various forms such as, the system requesting hands-on towing, prompting driver to prepare to take over control, adjusting speed of the vehicle or other driving condition, or deactivating hands-free towing altogether.

While trailer sway module 142 proceeds in blocks 314 or 316, it continues to analyze key performance indicators (KPIs) on the existing and new driving scenarios and record the performance (e.g., whether a sway condition occurs), at block 318. These KPIs may include data relating to sway such as, for example, new or previously towed trailer specifications, tire pressure/change in pressure, speed, predicted disturbance from passing vehicles (e.g., high profile vehicles), curve entry/exit, lane position/change, trailer weight, weight balance of trailer, parameters discussed in FIG. 2C, etc. The curve entry is the beginning of the curve where the driver steers the wheel straight to a certain angle and vice versa for the end of the curve (curve exit), essentially a transition in steering angle.

At block 320, trailer sway module 142 updates a local or remote database with the KPIs. This database is used to store, amongst other data, operating condition guarantee tables (e.g., no sway parameter values) for each trailer that has been towed by vehicle 105, including the current trailer 160, and corresponding KPIs. This data is then iteratively fed back into block 312, and used to determine whether predicted driving scenarios have been fault-free.

In yet other embodiments, going back to block 318, the measured KPIs and performance records for the various driving scenarios may also be communicated to other towing vehicles on the network 130, at block 322. This condition data may also include info about the trailer and the tow vehicle. As such, other vehicles on the network are updated with fault-free scenarios to enable hands-free towing so long as the fault-free driving scenarios exist.

Figure 3B:
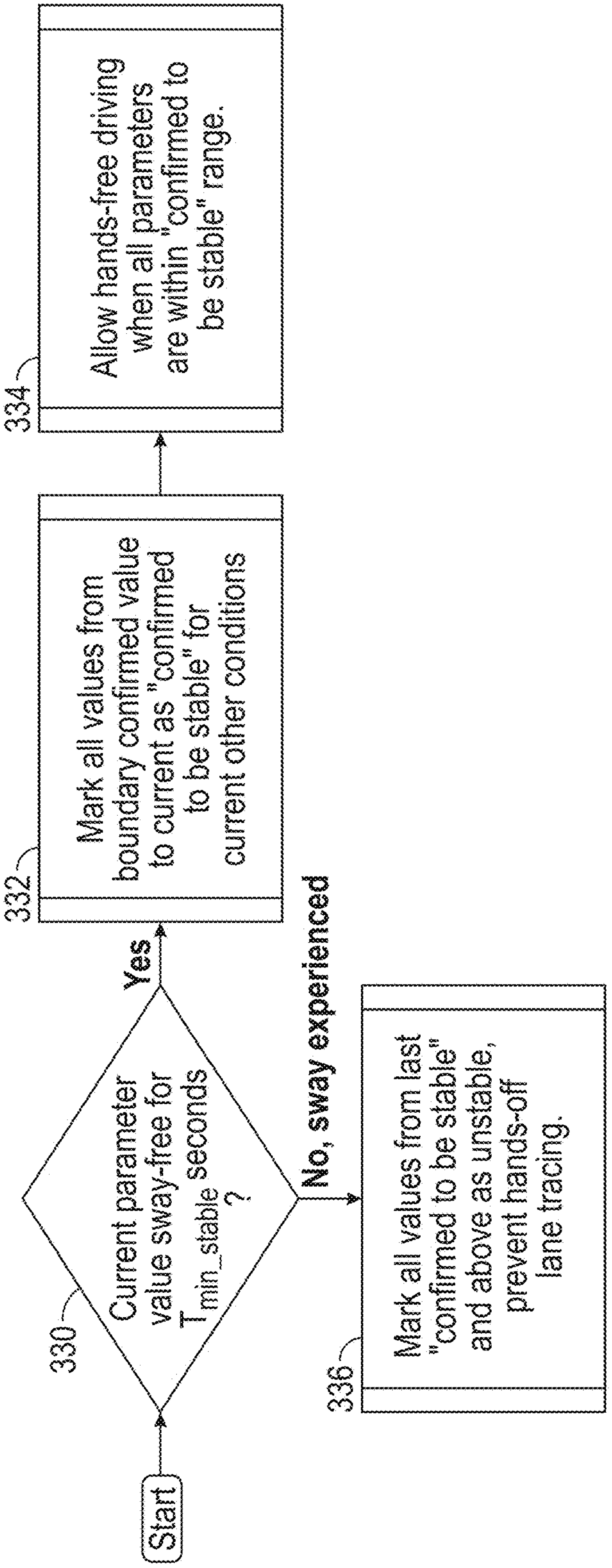
FIG. 3B is a flow chart of a method to establish new fault-free driving scenarios, according to an illustrative embodiment of the present disclosure.

FIG. 3B is a flow chart of a method to establish new fault-free driving scenarios, according to an illustrative embodiment of the present disclosure. Here, the driver is operating vehicle 105 in a hands-on towing capacity. As vehicle 105 is being driven, the system obtains the vehicle/trailer specifications and parameters as discussed in blocks 304, 308 and 310 of FIG. 3A. At block 330, the system determines if the current parameter value(s) are sway free for $T_{min\text{-}stable}$ seconds, which could be any desired timeframe. If those parameters (e.g., those of FIG. 2) are found to be sway stable, the system marks all parameter values up to that boundary as "confirmed to be stable" for the current other conditions (e.g., map ahead scenery, weather, etc), at block 332. At block 334, the system then enables hands-free towing as long as all parameters are within the "confirmed to be stable" range. If, however, at block 330 the system determines sway is being experienced, those corresponding parameter values (outside any previously confirmed stable values) are recorded unstable, thus preventing enabling of hands-free towing, at block 336.

Further, with reference back to block 316 of FIG. 3A, the system will request hands-on during any event/parameter value range until the vehicle reaches "confirmed to be stable" range for all parameters (with no events/other values expected). This approach is implemented by the system for actual or predicted (block 306) parameters.

Figure 4:
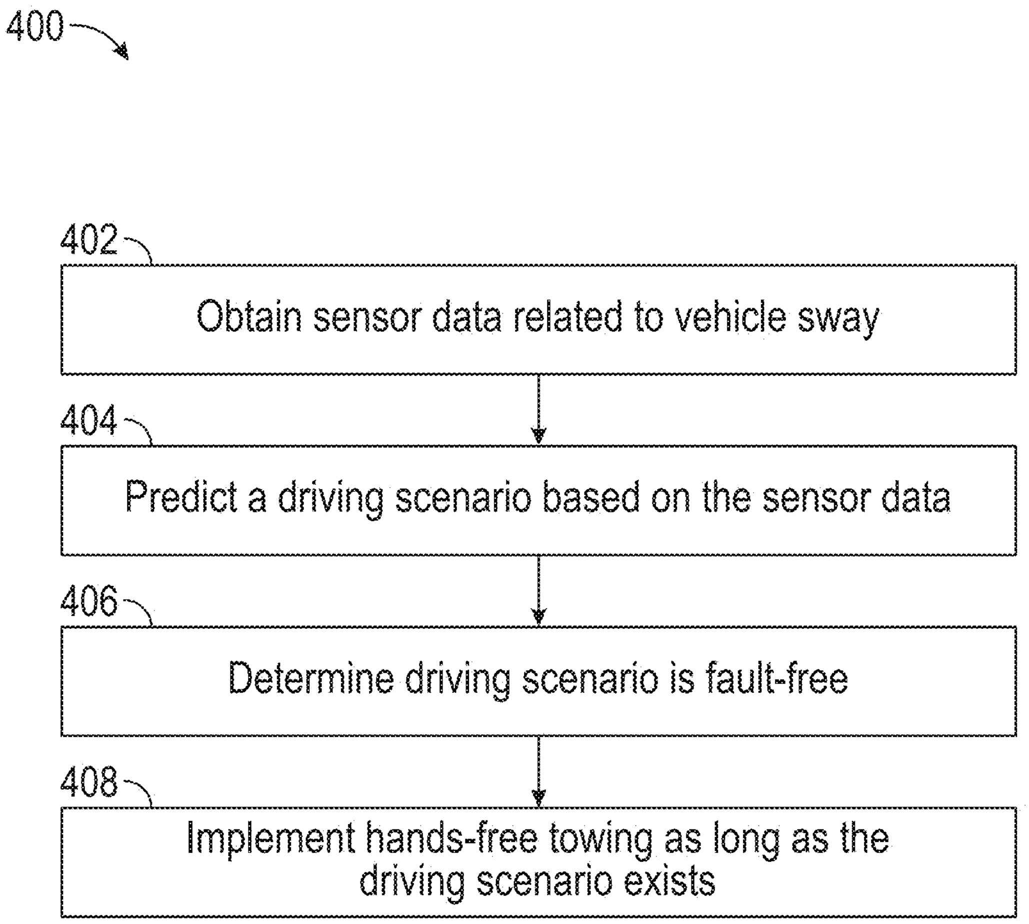
FIG. 4 is a flow chart of a method to provide trailer sway countermeasures during hands-free towing, according to certain illustrative embodiments of the present disclosure.

FIG. 4 is a flow chart of a method to provide trailer sway countermeasures during hands-free towing, according to certain illustrative embodiments of the present disclosure. At block 402 of method 400, hands-free towing system 100 obtains sensor data of a vehicle related to a sway condition of a trailer being towed by the vehicle. At block 404, the system predicts, based upon the sensor data, a driving scenario of the vehicle. At block 406, the system then determines whether the driving scenario has been fault-free and, when the driving scenario is determined to be fault-free (at block 408), the system will implement hands-free towing so long as the driving scenario exists.

Accordingly, embodiments of the present disclosure automatically implement countermeasures to avoid sway during hands-free towing. Hands-free towing is allowed so long as the KPIs are within values known by the system to be stable (sway-free). When those parameters change (or are outside the known sway-free values), countermeasures are enabled (e.g., requesting hands-on driving/towing) while the system continues to analyze the new parameters for sway. If those parameters are also established to be sway-free, hands-free towing will subsequently be allowed within those pre-established parameter ranges. At the same time, the system also continuously monitors the trailer and towing vehicle for sway to implement countermeasures, if necessary. Further, the system also prohibits hands-free towing above a certain speed if persistent oscillation has been detected.

Figure 5:
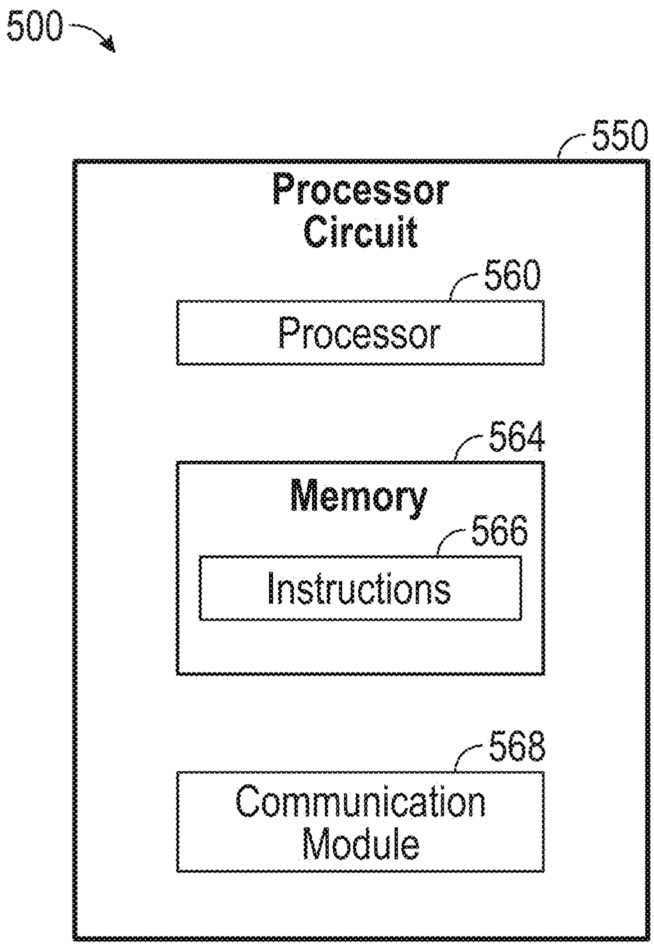
FIG. 5 is a schematic diagram of a processor circuit used in accordance with at least one embodiment of the present disclosure.

FIG. 5 is a schematic diagram of a processor circuit 550 in accordance with at least one embodiment of the present disclosure. The processor circuit 550 may be implemented in the system 100, or other devices or workstations (e.g., third-party workstations, network routers, etc.), or on a cloud processor or other remote processing unit, as necessary to implement the methods described herein. As shown, the processor circuit 550 may include a processor 560, a memory 564 having instructions 566 thereon, and a communication module 568. These elements may be in direct or indirect communication with each other, for example via one or more buses.

The processor 560 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 560 may also comprise another hardware device, a firmware device, or any combination thereof configured to perform the operations described herein. The processor 560 may also be implemented as a combination of computing devices, e.g., a combination of a DSP and a microprocessor, a plurality of microprocessors, one or more microprocessors in conjunction with a DSP core, or any other such configuration.

The memory 564 may include a cache memory (e.g., a cache memory of the processor 560), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 564 includes a non-transitory computer-readable medium. The memory 564 may store instructions 566. The instructions 566 may include instructions that, when executed by the processor 560, cause the processor 560 to perform the operations described herein. Instructions 566 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 568 can include any electronic circuitry and/or logic circuitry to facilitate direct or indirect communication of data between the processor circuit 550, and other processors or devices. In that regard, the communication module 568 can be an input/output (I/O) device. In some instances, the communication module 568 facilitates direct or indirect communication between various elements of the processor circuit 550 and/or the system 100. The communication module 568 may communicate within the processor circuit 550 through numerous methods or protocols. Serial communication protocols may include but are not limited to United States Serial Protocol Interface (US SPI), Inter-Integrated Circuit ($I^2C$), Recommended Standard 232 (RS-232), RS-485, Controller Area Network (CAN), Ethernet, Aeronautical Radio, Incorporated 429 (ARINC 429), MODBUS, Military Standard 1553 (MIL-STD-1553), or any other suitable method or protocol. Parallel protocols include but are not limited to Industry Standard Architecture (ISA), Advanced Technology Attachment (ATA), Small Computer System Interface (SCSI), Peripheral Component Interconnect (PCI), Institute of Electrical and Electronics Engineers 488 (IEEE-488), IEEE-1284, and other suitable protocols. Where appropriate, serial and parallel communications may be bridged by a Universal Asynchronous Receiver Transmitter (UART), Universal Synchronous Receiver Transmitter (USART), or other appropriate subsystem.

External communication (including but not limited to software updates, firmware updates, preset sharing between the processor and central server, or readings from vehicle or environmental sensors) may be accomplished using any suitable wireless or wired communication technology, such as a cable interface such as a universal serial bus (USB), micro USB, Lightning, or FireWire interface, Bluetooth, Wi-Fi, ZigBee, Li-Fi, or cellular data connections such as 2G/GSM (global system for mobiles), 3G/UMTS (universal mobile telecommunications system), 4G, long term evolution (LTE), WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

These and other advantages will be readily apparent to those ordinarily skilled in the art having the benefit of this disclosure.

Methods and embodiments described herein further relate to any one or more of the following paragraphs:

1. A computer-implemented method to provide trailer sway countermeasures during hands-free towing, comprising: obtaining, by processing circuitry communicably coupled to one or more sensors of a vehicle, sensor data of a vehicle related to a sway condition of a trailer; predicting, based upon the sensor data, a driving scenario of the vehicle; determining the driving scenario has been fault-free; and in response to the determination, implementing hands-free towing so long as the driving scenario exists.
2. The computer-implemented method as defined in paragraph 1, further comprising: determining the driving scenario no longer exists; and in response to the determination the driving scenario no longer exists, implementing trailer sway countermeasures.
3. The computer-implemented method as defined in paragraphs 1 or 2, further comprising: communicating the driving scenario to other vehicles; and allowing hands-free towing of the other vehicles so long as the driving scenario exists.
4. The computer-implemented method as defined in any of paragraphs 1-3, wherein the sensor data comprises at least one of a map of a driving scene ahead of the vehicle; a vehicle trailer specification; a vehicle specification; vehicle speed; conditions surrounding the vehicle; or road design.
5. The computer-implemented method as defined in any of paragraphs 1-4, wherein the countermeasures comprise adjusting vehicle speed.
6. The computer-implemented method as defined in any of paragraphs 1-5, wherein the countermeasures comprise deactivating hands-free towing.
7. The computer-implemented method as defined in any of paragraphs 1-6, wherein the sensor data comprises a predicted disturbance caused by passing traffic.
8. A vehicle, comprising a trailer; one or more sensors communicably coupled to the trailer; and processing circuitry communicably coupled to the sensors and operable to perform operations comprising: obtaining sensor data of the vehicle related to a sway condition of the trailer; predicting, based upon the sensor data, a driving scenario of the vehicle; determining the driving scenario has been fault-free; and in response to the determination, implementing hands-free towing so long as the driving scenario exists.
9. The vehicle as defined in paragraph 8, wherein the operations further comprise: determining the driving scenario no longer exists; and in response to the determination the driving scenario no longer exists, implementing trailer sway countermeasures.
10. The vehicle as defined in paragraphs 8 or 9, wherein the operations further comprise communicating the driving scenario to other vehicles; and allowing hands-free towing of the other vehicles so long as the driving scenario exists.

11. The vehicle as defined in any of paragraphs 8-10, wherein the sensor data comprises at least one of a map of a driving scene ahead of the vehicle; a vehicle trailer specification; a vehicle specification; vehicle speed; conditions surrounding the vehicle; or road design.
12. The vehicle as defined in any of paragraphs 8-11, wherein the countermeasures comprise adjusting vehicle speed; or deactivating hands-free towing.
13. The vehicle as defined in any of paragraphs 8-12, wherein the sensor data comprises a predicted disturbance caused by passing traffic.
14. The vehicle as defined in any of paragraphs 8-13, wherein the sensor data comprises a predicted disturbance caused by passing traffic.

Moreover, the methods described herein may be embodied within a system comprising processing circuitry to implement any of the methods, or a in a non-transitory computer-readable medium comprising instructions which, when executed by at least one processor, causes the processor to perform any of the methods described herein.

The technology described herein may be implemented on manually controlled vehicles or driver-assist vehicles. The technology may be implemented in diverse combinations of hardware, software, and firmware, depending on the implementation or as necessitated by the structures and modules already present in existing vehicles. The system may be employed on vehicles with automatic transmission, manual transmissions, or vehicles with simulated shifting, including continuously variable transmission (CVT), infinitely variable transmission (IVT), hybrid transmissions (e.g., a hybrid vehicle with 4-speed automatic transmission simulating 10 gears), and fully electric vehicles.

Accordingly, the logical operations making up the embodiments of the technology described herein may be referred to variously as operations, steps, blocks, objects, elements, components, or modules. Furthermore, it should be understood that these may occur or be arranged in any order, unless explicitly claimed otherwise or a specific order is necessitated by the claim language or by the nature of the component or step.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the cargo seat adjustment system. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the vehicle door activating system as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter. Additionally, sensors external to the vehicle may be employed to provide or supplement any of the sensor data described hereinabove. Alternatively, machine learning algorithms or other AI systems may be used to estimate variables from sparse, noisy, or entwined data streams without departing from the spirit of the present disclosure.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A computer-implemented method to provide trailer sway countermeasures during hands-free towing, comprising:
- obtaining, by processing circuitry communicably coupled to one or more sensors of a vehicle, sensor data of a vehicle related to a sway condition of a trailer;
- predicting, based upon the sensor data, a driving scenario of the vehicle;
- determining the driving scenario has been fault-free by comparing the driving scenario to a past no-fault driving scenario; and
- in response to the determination, implementing hands-free towing so long as the driving scenario exists.

2. The computer-implemented method as defined in claim 1, further comprising:
- determining the driving scenario no longer exists; and
- in response to the determination the driving scenario no longer exists, implementing trailer sway countermeasures.

3. The computer-implemented method as defined in claim 2, wherein the countermeasures comprise adjusting vehicle speed.

4. The computer-implemented method as defined in claim 2, wherein the countermeasures comprise deactivating hands-free towing.

5. The computer-implemented method as defined in claim 1, further comprising:
- communicating the driving scenario to other vehicles; and
- allowing hands-free towing of the other vehicles so long as the driving scenario exists.

6. The computer-implemented method as defined in claim 1, wherein the sensor data comprises at least one of:
- a map of a driving scene ahead of the vehicle;
- a vehicle trailer specification;
- a vehicle specification;
- vehicle speed;
- conditions surrounding the vehicle; or
- road design.

7. The computer-implemented method as defined in claim 1, wherein the sensor data comprises a predicted disturbance caused by passing traffic.

8. A non-transitory computer-readable storage medium storing instructions that, when executed by a computing system, cause the computing system to perform operations comprising:
- obtaining, by processing circuitry communicably coupled to one or more sensors of a vehicle, sensor data of a vehicle related to a sway condition of a trailer;
- predicting, based upon the sensor data, a driving scenario of the vehicle;
- determining the driving scenario has been fault-free by comparing the driving scenario to a past no-fault driving scenario; and in response to the determination, implementing hands-free towing so long as the driving scenario exists.

9. The computer-readable storage medium as defined in claim 8, further comprising operations to:

determine the driving scenario no longer exists; and in response to the determination the driving scenario no longer exists, implement trailer sway countermeasures.

10. The computer-readable storage medium as defined in claim 9, wherein the countermeasures comprise:

adjusting vehicle speed; or deactivating hands-free towing.

11. The computer-readable storage medium as defined in claim 8, further comprising operations to:

communicate the driving scenario to other vehicles; and allow hands-free towing of the other vehicles so long as the driving scenario exists.

12. The computer-readable storage medium as defined in claim 8, wherein the sensor data comprises at least one of:

a map of a driving scene ahead of the vehicle;

a vehicle trailer specification;

a vehicle specification;

vehicle speed;

conditions surrounding the vehicle; or road design.

13. The computer-readable storage medium as defined in claim 8, wherein the sensor data comprises a predicted disturbance caused by passing traffic.

14. A vehicle, comprising:

a trailer;

one or more sensors communicably coupled to the trailer; and processing circuitry communicably coupled to the sensors and operable to perform operations comprising:

obtaining sensor data of the vehicle related to a sway condition of the trailer;

predicting, based upon the sensor data, a driving scenario of the vehicle;

determining the driving scenario has been fault-free by comparing the driving scenario to a past no-fault driving scenario; and in response to the determination, implementing hands-free towing so long as the driving scenario exists.

15. The vehicle as defined in claim 14, wherein the operations further comprise:

determining the driving scenario no longer exists; and in response to the determination the driving scenario no longer exists, implementing trailer sway countermeasures.

16. The vehicle as defined in claim 15, wherein the countermeasures comprise:

adjusting vehicle speed; or deactivating hands-free towing.

17. The vehicle as defined in claim 14, wherein the operations further comprise:

communicating the driving scenario to other vehicles; and allowing hands-free towing of the other vehicles so long as the driving scenario exists.

18. The vehicle as defined in claim 14, wherein the sensor data comprises at least one of:

a map of a driving scene ahead of the vehicle;

a vehicle trailer specification;

a vehicle specification;

vehicle speed;

conditions surrounding the vehicle; or road design.

19. The vehicle as defined in claim 14, wherein the sensor data comprises a predicted disturbance caused by passing traffic.

20. The vehicle as defined in claim 14, wherein the sensor data comprises a predicted disturbance caused by passing traffic.

* * * * *